(12) United States Patent
Hu et al.

(10) Patent No.: US 11,479,148 B2
(45) Date of Patent: Oct. 25, 2022

(54) PERSONALIZATION SETTINGS BASED ON BODY MEASUREMENTS

(71) Applicant: GM GLOBAL TECHNOLOGY OPERATIONS LLC, Detroit, MI (US)

(72) Inventors: Yasen Hu, Warren, MI (US); Kausalya Singuru, Troy, MI (US); Shiming Duan, Ann Arbor, MI (US); Yao Hu, Sterling Heights, MI (US); Nicholas W. Pinto, Shelby Township, MI (US); Bradley R. Frieberg, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 603 days.

(21) Appl. No.: 16/535,642

(22) Filed: Aug. 8, 2019

(65) Prior Publication Data
US 2021/0039521 A1 Feb. 11, 2021

(51) Int. Cl.
| | |
|---|---|
| *G06F 17/00* | (2019.01) |
| *B60N 2/02* | (2006.01) |
| *G06T 7/73* | (2017.01) |
| *B60R 1/07* | (2006.01) |
| *G06T 7/60* | (2017.01) |
| *G06V 40/10* | (2022.01) |

(52) U.S. Cl.
CPC .............. *B60N 2/0244* (2013.01); *B60R 1/07* (2013.01); *G06T 7/60* (2013.01); *G06T 7/73* (2017.01); *G06V 40/103* (2022.01); *B60N 2002/0268* (2013.01); *G06T 2207/30196* (2013.01); *G06T 2207/30252* (2013.01)

(58) Field of Classification Search
CPC .......... B60N 2/0244; B60N 2002/0268; G06T 7/73; G06T 7/60; G06T 2207/30196; G06T 2207/30252; G06V 40/103; B60R 1/07
See application file for complete search history.

(56) References Cited

U.S. PATENT DOCUMENTS

| | | | | |
|---|---|---|---|---|
| 9,070,019 | B2 * | 6/2015 | Holz | G06V 40/28 |
| 9,153,028 | B2 * | 10/2015 | Holz | G06T 17/00 |
| 9,798,935 | B2 * | 10/2017 | Sandahi | G06T 7/60 |

* cited by examiner

*Primary Examiner* — Adam M Alharbi
(74) *Attorney, Agent, or Firm* — Cantor Colburn LLP (57) ABSTRACT

A system and method for personalization of adjustable features of a vehicle. The system includes a processor and an actuator. The processor detectors key points of a person from a two-dimensional image and predicts a pose of the person. The processor translates a respective position of the key points from a two-dimensional coordinate system to a three-dimensional coordinate system based in part on the pose and measurements of distances between the key points. The processor determines a baseline configuration of an adjustable feature of the vehicle based in part on measurements between the key points in the three-dimensional coordinate system. The processor causes an actuator to adjust the adjustable feature to conform to the baseline configuration.

20 Claims, 5 Drawing Sheets

PERSONALIZATION SETTINGS BASED ON BODY MEASUREMENTS

INTRODUCTION

The subject disclosure relates to vehicles, and more particularly relates to a personalization of vehicle features.

More and more drivers and passengers are relying on third party vehicles to move to and from their chosen destination. The third-party vehicles are not always the same make, model, or year of the driver or passenger's own vehicle. In order to recreate the personalized settings for safety and comfort of their own vehicles, drivers and passengers manually adjust the seat and mirror settings to their liking. Accordingly, it is desirable to enable vehicles to recognize a driver or passenger's measurements and automatically adjust the vehicle settings.

SUMMARY

In one exemplary embodiment, a method for personalization of adjustable features of a vehicle is shown. A two-dimensional image of a person is processed to detect key points of the person and predict a pose of the person. The respective positions of the key points from a two-dimensional coordinate system are translated to a three-dimensional coordinate system based in part on the pose. A baseline configuration of an adjustable feature of the vehicle is determined based in part on measurements between the key points in the three-dimensional coordinate system. An actuator adjusts the adjustable feature of the vehicle to conform to the baseline configuration.

In addition to the one or more features described herein, the two-dimensional image is received from at least one camera attached to the vehicle.

In addition to the one or more features described herein, the adjustable feature of the vehicle is one of a seat, a side mirror, or a rear-view mirror.

In addition to the one or more features described herein, the pose is one of standing, sitting, and walking.

In addition to the one or more features described herein, the method further includes calculating the measurements based in part on the pose.

In addition to the one or more features described herein, the method further includes associating the baseline configuration of the adjustable feature with an identity of the person. The associated identity and baseline configuration are stored in a remote database.

In addition to the one or more features described herein, the method further includes recording each change in the adjustable feature from the baseline configuration by the person. The associated baseline configuration is updated in the database, based on a number of similar changes to the adjustable feature exceeding a threshold amount.

In another exemplary embodiment, a system for personalization of adjustable features of a vehicle is shown. A processor detects key points from a two-dimensional image of a person and predicts a pose of the person. The respective positions of the key points from a two-dimensional coordinate system are translated to a three-dimensional coordinate system based in part on the pose. A baseline configuration of an adjustable feature of the vehicle is determined based, in part, on measurements between the key points in the three-dimensional coordinate system. An actuator adjusts the adjustable feature of the vehicle to conform to the baseline configuration.

In addition to the one or more features described herein, the two-dimensional image is received from at least one camera attached to the vehicle.

In addition to the one or more features described herein, the adjustable feature of the vehicle is one of a seat, a side mirror, or a rear-view mirror.

In addition to the one or more features described herein, the pose is one of standing, sitting, and walking.

In addition to the one or more features described herein, the processor is further configured to calculate the measurements based in part on the pose.

In addition to the one or more features described herein, the processor associates the baseline configuration of the adjustable feature with an identity of the person. The processor stores the associated identity and baseline configuration in a remote database.

In addition to the one or more features described herein, the processor records each change in the adjustable feature from the baseline configuration by the person. The processor updates the associated baseline configuration in the database, based on a number of similar changes to the adjustable feature exceeding a threshold amount.

In another exemplary embodiment, a computer readable storage medium having program instructions embodied therein is shown. The program instructions executable by a processor to cause the processor to perform operations comprising detecting key points from a two-dimensional image of a person and predicting a pose of the person. The respective positions of the key points from a two-dimensional coordinate system are translated to a three-dimensional coordinate system based in part on the pose. A baseline configuration of an adjustable feature of the vehicle is determined based in part on measurements between the key points in the three-dimensional coordinate system. An actuator adjusts the adjustable feature of the vehicle to conform to the baseline configuration.

In addition to the one or more features described herein, the two-dimensional image is received from at least one camera attached to the vehicle.

In addition to the one or more features described herein, the adjustable feature of the vehicle is one of a seat, a side mirror, or a rear-view mirror.

In addition to the one or more features described herein, the pose is one of standing, sitting, and walking.

In addition to the one or more features described herein, the processor is further configured to calculate the measurements based in part on the pose.

In addition to the one or more features described herein, the processor associates the baseline configuration of the adjustable feature with an identity of the person. The processor stores the associated identity and baseline configuration in a remote database.

In addition to the one or more features described herein, the processor records each change in the adjustable feature from the baseline configuration by the person. The processor updates the associated baseline configuration in the database, based on a number of similar changes to the adjustable feature exceeding a threshold amount.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, (e.g., memory elements, digital signal processing elements, logic elements, look-up tables, or the like), which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

In modern society, drivers and passengers are no longer restricted to personal vehicle use. The rise of ride-sharing applications and short-term rental vehicles have enabled a situation, in which vehicles are chosen based on a specific task or destination rather than ownership. However, drivers and passengers utilizing third-party vehicles still want the safety and comfort of their personalized settings for adjustable vehicle elements such as a seat, and a rear-view and a side mirror configuration. Through the advent of software applications, owned vehicles can identify a driver or passenger prior to entering the vehicle. However, third party, vehicles have no mechanism of identifying passengers and knowing preferences until the person is already in the vehicle. Embodiments of the disclosure provide systems and methods of identifying and using key points of an unknown person's body and adjusting the vehicle elements to conform to a baseline configuration prior to entering the vehicle.

Figure 1:
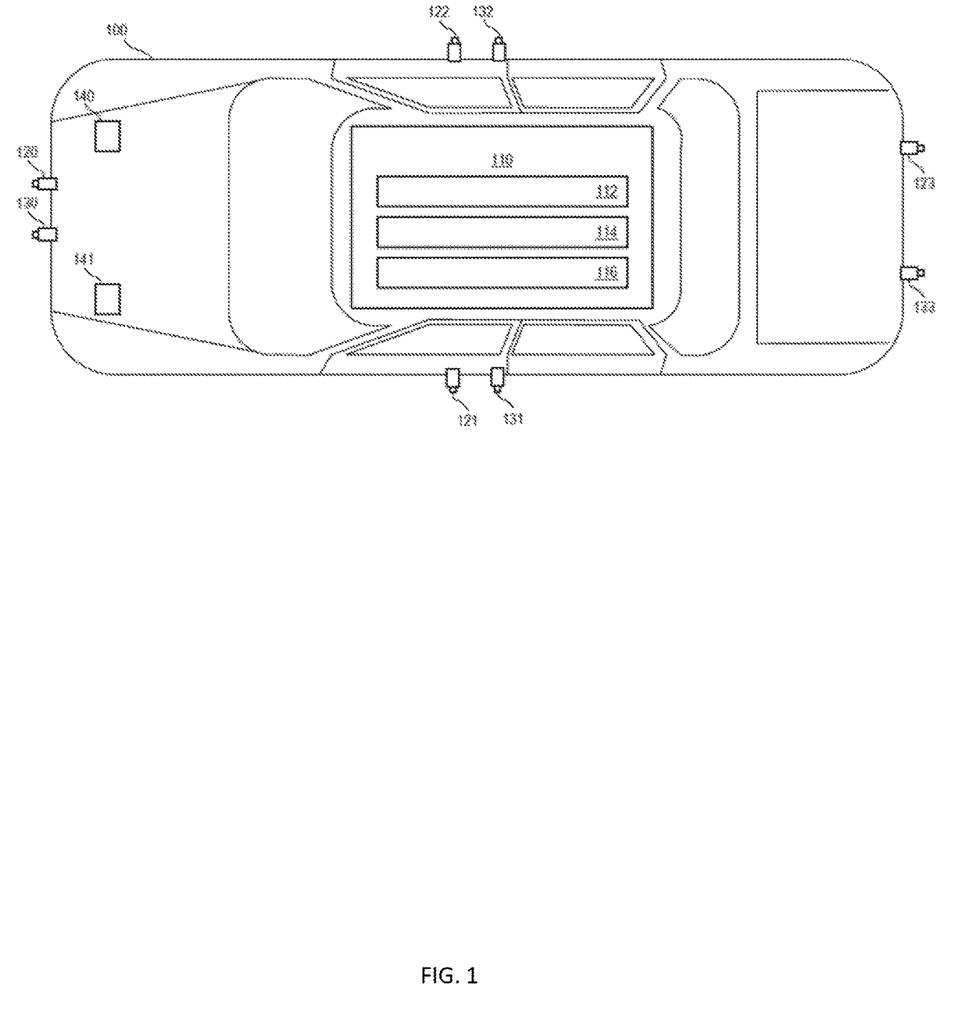
FIG. 1 is an illustration of a vehicle, according to an embodiment of the present disclosure.

FIG. 1 depicts a vehicle 100 including sensors and a processing system 110 for multi-sensor multi-object sensing and identification according to one or more embodiments described herein. In the example of FIG. 1, the vehicle 100 includes the processing system 110, and sensors. The sensors include cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.) and identification of individuals accessing the vehicle. The cameras 130-133 are long-range cameras that capture images external to the vehicle and that are farther away from the vehicle 100 than the cameras 120-123. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle. The captured images can be displayed as live images, still images, or some combination thereof. In some examples, the images can be combined to form a composite view, such as the surround view.

The radar sensor 140 measures a range to a target object by transmitting electromagnetic waves and measuring the reflected waves with a sensor. This information is useful for determining a target object's distance/location relative to the vehicle 100.

The LiDAR (light detection and ranging) sensor 141 measures a distance to a target object by illumining the target with pulsed laser light and measuring the reflected pulses with a sensor. This information is useful for determining a target object's distance/location relative to the vehicle 100.

Data generated from the cameras 120-123, 130-133, the radar sensor 140, and/or the LiDAR sensor 141 can be used to track a target object/individual relative to the vehicle 100. Accordingly, the present techniques provide for translating two-dimensional coordinates from an image to three-dimensional coordinates of key points.

To accomplish this, the processing system 110 includes and utilizes a detection engine 112, an association engine 114, and a control engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like. The features and functionality of the components of the processing system 110 are described further herein. The processing system 110 of the vehicle 100 performs adjustments of personal settings of the vehicle.

Any one of the cameras 120-123 and 130-133 can capture a two-dimensional image of a person approaching the vehicle. The images are transmitted to the processing system 110. The processing system 110 processes the images through a two-stage neural network to extract coordinates of key points of the person. The key points including key body parts including but not limited to the head, knees, feet, and torso. The neural network receives the images and through a series of convolution and pooling operations, generates a feature map to identify the key points in the images. The first stage predicts an affinity field that encodes identified features to associate the features with the body of a particular person. The second stage produces a confidence map as to the probability that an identified feature is a key point.

Figure 2:
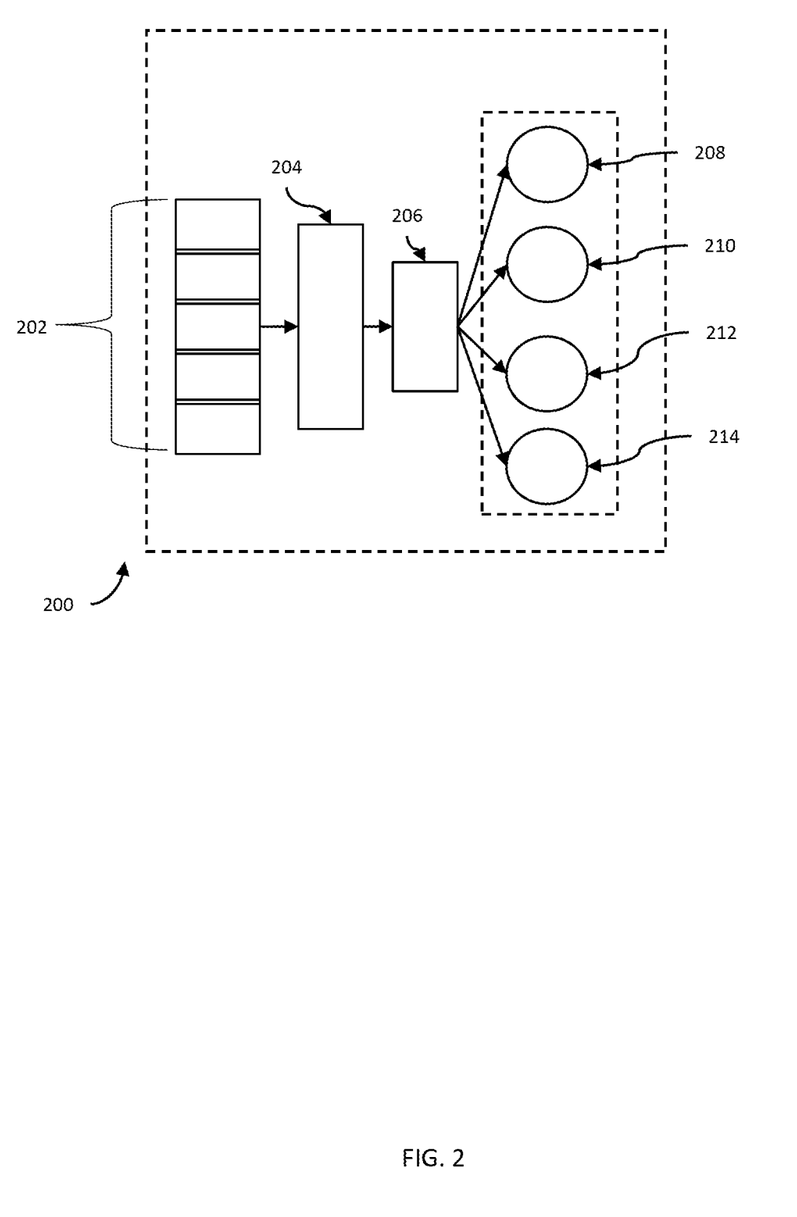
FIG. 2 is a block diagram of a pose classifier, according to an embodiment of the present disclosure.

Referring to FIG. 2, the output of the second stage is transmitted to a pose classifier 200. The identified key points 202 are processed through a first fully connected layer 204 and a second fully connected layer 206. Based on the processing in the fully connected layers 204, 206, the pose classifier predicts the person's pose as the image was captured. In some embodiments, this process is performed using a SoftMax function to map an output of the second stage of the network to a probability distribution over predicted output classes. The output classes include the respective poses the person is in when the image is captured. For example, the person may be classified as standing 208, sitting 210, walking 212, another pose, or combination of poses 214. It should be appreciated that although FIG. 2 depicts two fully connected layers, the pose classifier could include a fewer or greater number of fully connected layers.

Based on the pose, the processing system 110 chooses equations to calculate measurements between the key points. For example, with a person classified as standing straight up, the measurement is a vertical distance from the ground between the foot and the knee. If, however, the person is in a walking or running pose, a distance from the foot to the knee is at an angle from the ground.

Figure 3:
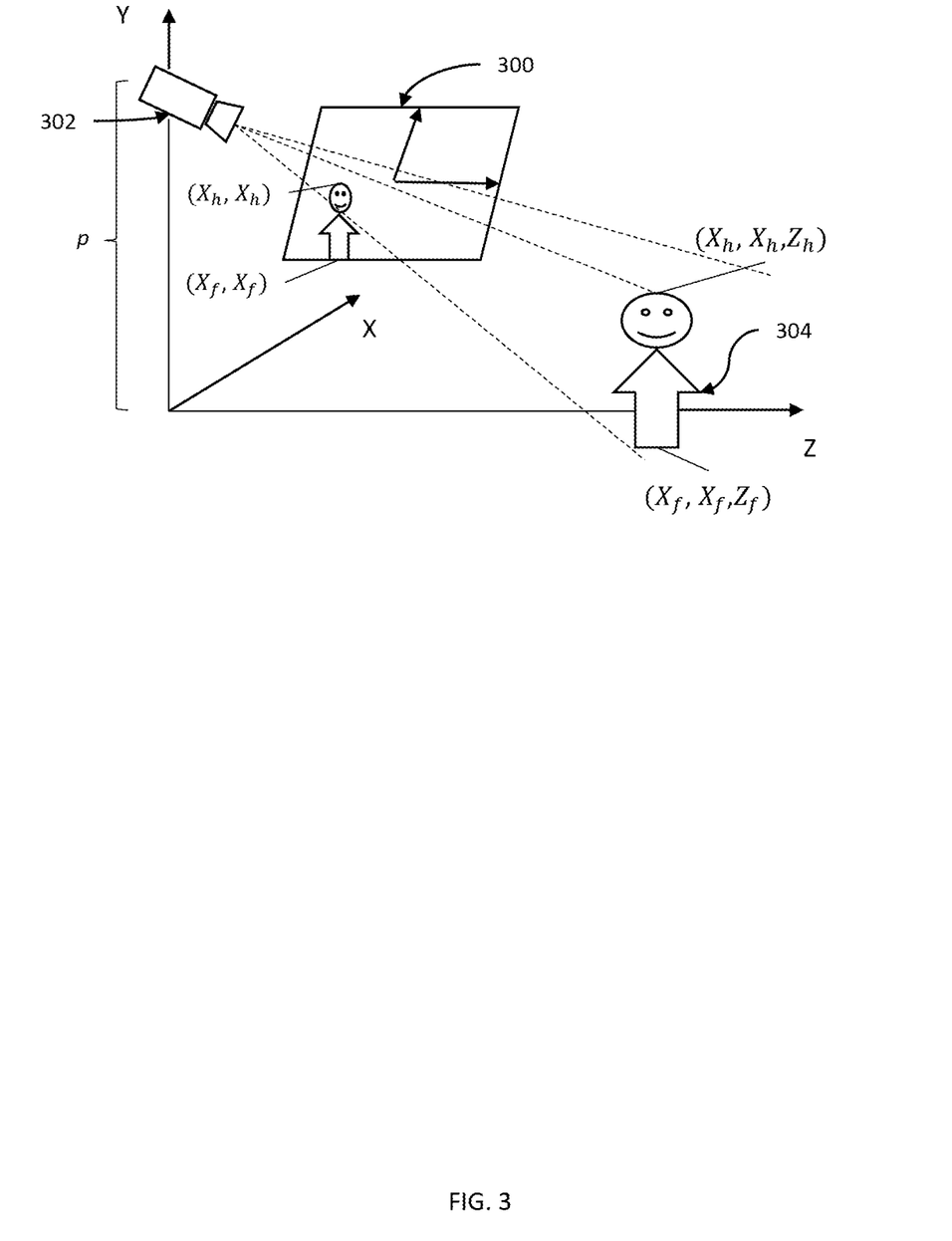
FIG. 3 is an illustration of a two-dimensional image and an accompanying three-dimensional object, according to an embodiment of the present disclosure.

Referring to FIG. 3, an illustration is provided of translating the two-dimensional coordinates of the key points from the image 300 taken from a vehicle camera 302 into three-dimensional coordinates of the key points on the person 304. In FIG. 3 the y-axis is for a horizontal distance from the ground (wherein p is the distance of the camera from the ground), the x-axis is for a lateral distance of the person in relation to the focal point of a camera, and the z-axis is for a depth of the person from the camera.

Referring to equation 1, the processing system 110 converts two-dimensional coordinates to three-dimensional coordinates using the positions of the two-dimensional key points, camera parameters, and constraints. The processing system 110 receives the two-dimensional coordinates u, v, wherein u is a horizontal position of an image pixel, v is a vertical position of an image pixel, and a "1" is used a placeholder for the homogeneous coordinates. The processing system 110 then extracts three-dimensional coordinates x, y, and z by removing the intrinsic parameters of a camera f and c, wherein f is the focal length, and c is the principal point offset; and the extrinsic parameters R and T, wherein R is the rotational and T is a translational matrix, respectively as shown in equation (1) below. The three-dimensional coordinates x, y, and z can be back projected based on corresponding two-dimensional image pixels, the extrinsic parameters R and T, and the intrinsic parameters f and c. The intrinsic parameters and the extrinsic parameters are specific to each camera used and known prior to capturing the image.

$$z\begin{pmatrix} u \\ v \\ 1 \end{pmatrix} = \begin{pmatrix} f_x & 0 & c_x \\ 0 & f_y & c_y \\ 0 & 0 & 1 \end{pmatrix} \begin{pmatrix} R_{1,1} & R_{1,2} & R_{1,3} & T_1 \\ R_{2,1} & R_{2,2} & R_{2,3} & T_2 \\ R_{3,1} & R_{3,2} & R_{3,3} & T_3 \end{pmatrix} \begin{pmatrix} x \\ y \\ z \\ 1 \end{pmatrix} \quad (1)$$

In order to use equation 1, the processing system 110 applies constraints based on the predicted pose. If the person 304 is predicted to be standing, a flat ground assumption is used. The person is considered to have their feet flat on the ground, such that the measurement from the ground to a foot is zero. The key points at the feet are considered to be in the same coronal or frontal plane as the key points in the rest of the body. A point between the feet is considered to be in the same median or sagittal plane as other key points along the middle of the person's body. For example, a person's nose, chin, and hip center are all assumed to be within the median plane. Initially, the depth or z coordinate is calculated and the z coordinate for each key point is considered to be the same. The processing system 110 uses the extrinsic parameters, intrinsic parameters, and two-dimensional coordinates to calculate the three-dimensional x and y coordinates of each key point. In the three-dimensional coordinate system, y is for a three-dimensional height of the person and x is for a three-dimensional lateral distance of the person in relation to the focal point of a camera, and z is for a depth of the person from the camera.

The system translates the two-dimensional coordinates u, v to three-dimensional coordinates. To accomplish this, a value of a third dimension needs to be included with the two-dimensional coordinates. The system applies constraints to calculate a value for the third dimension. One constraint is the presumption of two feet on a flat surface, such that y=0. Therefore, a two-dimensional key point (u, v) at a foot has a corresponding three-dimensional point (x, 0, z). Applying this constraint and calculating the two-dimensional values u, v, the system calculates the value of the depth z and the lateral distance x of the person in relation to the focal point of the camera. Another constraint is that the body is within the same coronal or frontal plane and therefore each point is at a constant depth z. In other words, the calculated value for z is equivalent for all key points along the body. Using this method, the processing system 110 calculates the three-dimensional coordinate values of all the key points.

If the person's pose is classified as walking, the processing system 110 extracts the key points from multiple images. In this sense, multiple measurements are calculated to assess the distance between key points. This enables the processing system 110 to reconcile the difference in measurement from one key point to another due to the angling of joints in motion. In situations in which a person is seated, a first set of key points (for example, the head and the back) are assumed to lie in a first coronal or frontal plane. A second set of key points (for example, a knee and a foot of one leg) are within a second coronal or frontal plane. The second plane is assumed to have a depth less than a depth of the first plane. The processing system 110 does not consider that a point between the feet is in the same median or sagittal plane as other key points in the middle of the person's body.

Figure 4:
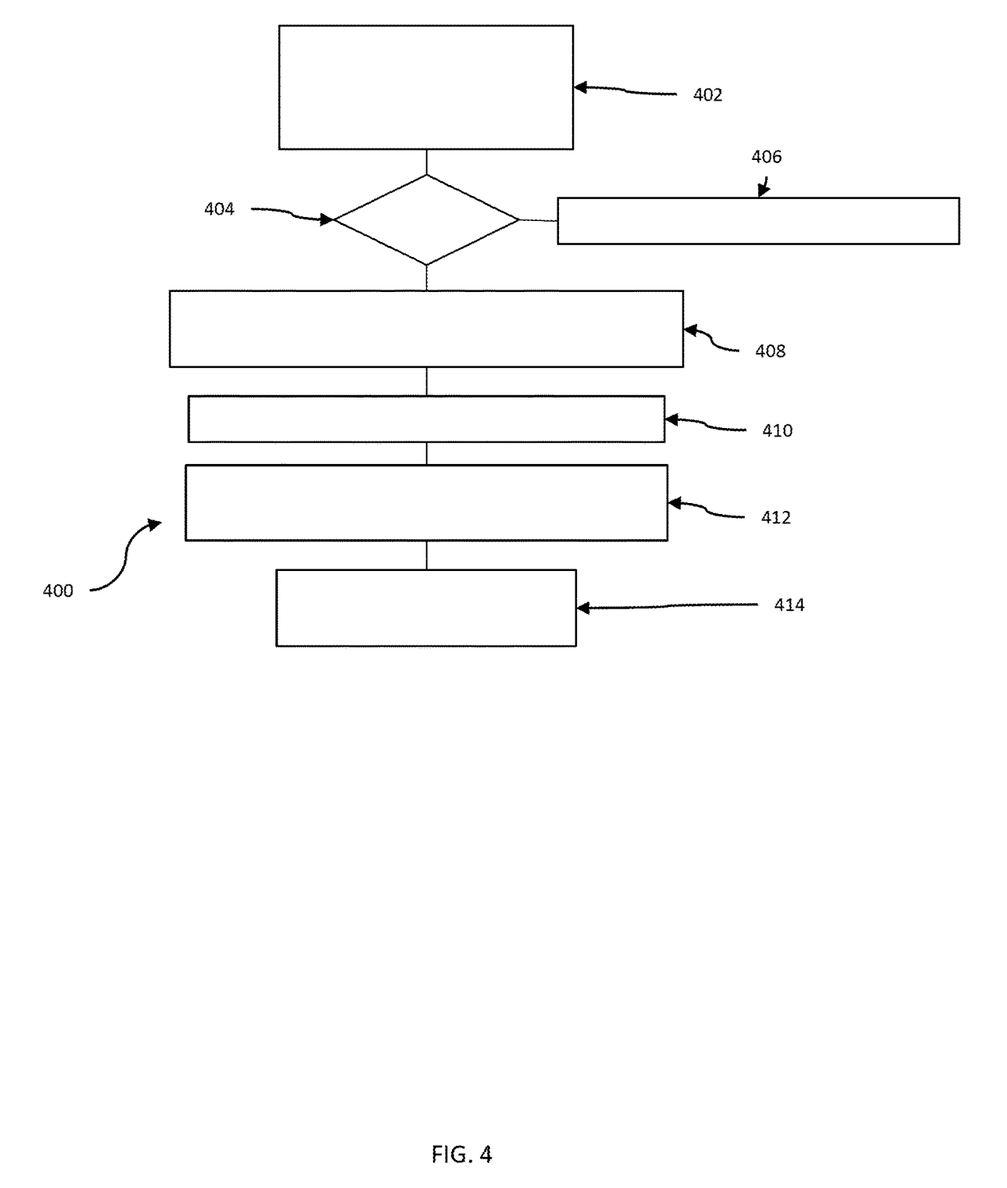
FIG. 4 is a block diagram of a method for personalization of a vehicle setting, according to an embodiment of the present disclosure.

Referring to FIG. 4, a method 400 for making automated adjustments of personalized settings in a vehicle is shown. At block 402, the vehicle detects a person approaching the vehicle and performs a driver recognition. In some embodiments, the vehicle is configured to sense the approaching person by receiving a signal from an electronic device (not shown) carried by the person. For example, the driver may have a key fob or a mobile device that emits a signal to the vehicle. In some embodiments, the vehicle detects the oncoming person by transmitting a signal, for example, through the radar or LIDAR and detects the person approaching through a signal response.

In some embodiments, the person's electronic device transmits identifying information to the vehicle. For example, the identifying information includes, but is not limited to, the identity and preferences as to seat position preferences, mirror adjustment preferences, temperature preferences, window position preferences, and musical preferences. In other instances, the electronic device transmits the person's identity, for example, through a unique identifier associated with the person. Based on the identifying information, the vehicle determines whether the person's preferences are stored in a database. In some embodiments, the database is local to the vehicle (not shown), and in other embodiments, the database is remote (not shown). The vehicle is configured to communicate with a remote database through any appropriate technology. The vehicle is configured to communicate via ethernet, fiber optics, microwave, wireless, cellular, or any other appropriate technology.

At block 404, the system determines the person approaching the car is recognized. At block 406, if the person's preferences have been previously stored, the settings are loaded to a processing system 110. The processing system 110 transmits the settings to respective actuators of the vehicle. If, however, the person's preferences are not stored in a database, the vehicle sends a signal to the person's electronic device that the person's profile is not in the database. Upon receiving the signal, the electronic device sends a signal to the vehicle to trigger the image capturing devices to capture an image of the person as they are approaching or opening a door. Additionally, at block 408, the processing system 110 uses a pre-trained deep neural network (DNN) or convolutional neural network (CNN) to identify key points on the person's body and predict a pose of the person. The two-dimensional coordinates from the image are then translated to three-dimensional coordinates.

At block 410, the processing system 110 calculates the measurements between the key points. At block 412, the measurements are compared to an index of baseline vehicle feature configurations. For example, an optimal angle of a side view mirror based on a height of the person, an optimal distance of a seat based on the length of the person's legs. In some embodiments, the baseline configurations are pre-loaded and stored locally in a database at the vehicle. In other embodiments, the configurations are stored remotely and transmitted to the vehicle. At block 414 the processing system 110 loads the baseline configurations to each actuator. The actuator (not shown) at each feature moves the feature to the baseline configuration. The baseline configurations are associated with the person and each association is stored at a remote location in a user profile. The user profile is transferable to other vehicles, and therefore the person can approach another vehicle and upon recognizing the identity of the person, the vehicle loads the baseline configurations for each feature.

Periodically, a person will change the setting of a feature. In this instance, the change in setting is recorded by the processing system 110 and transmitted to the remote database. The baseline configuration associated with the person is updated at the database. In some embodiments, the baseline configurations will remain static until the person changes the baseline configurations of a feature in a similar fashion more than a threshold number of times.

Figure 5:
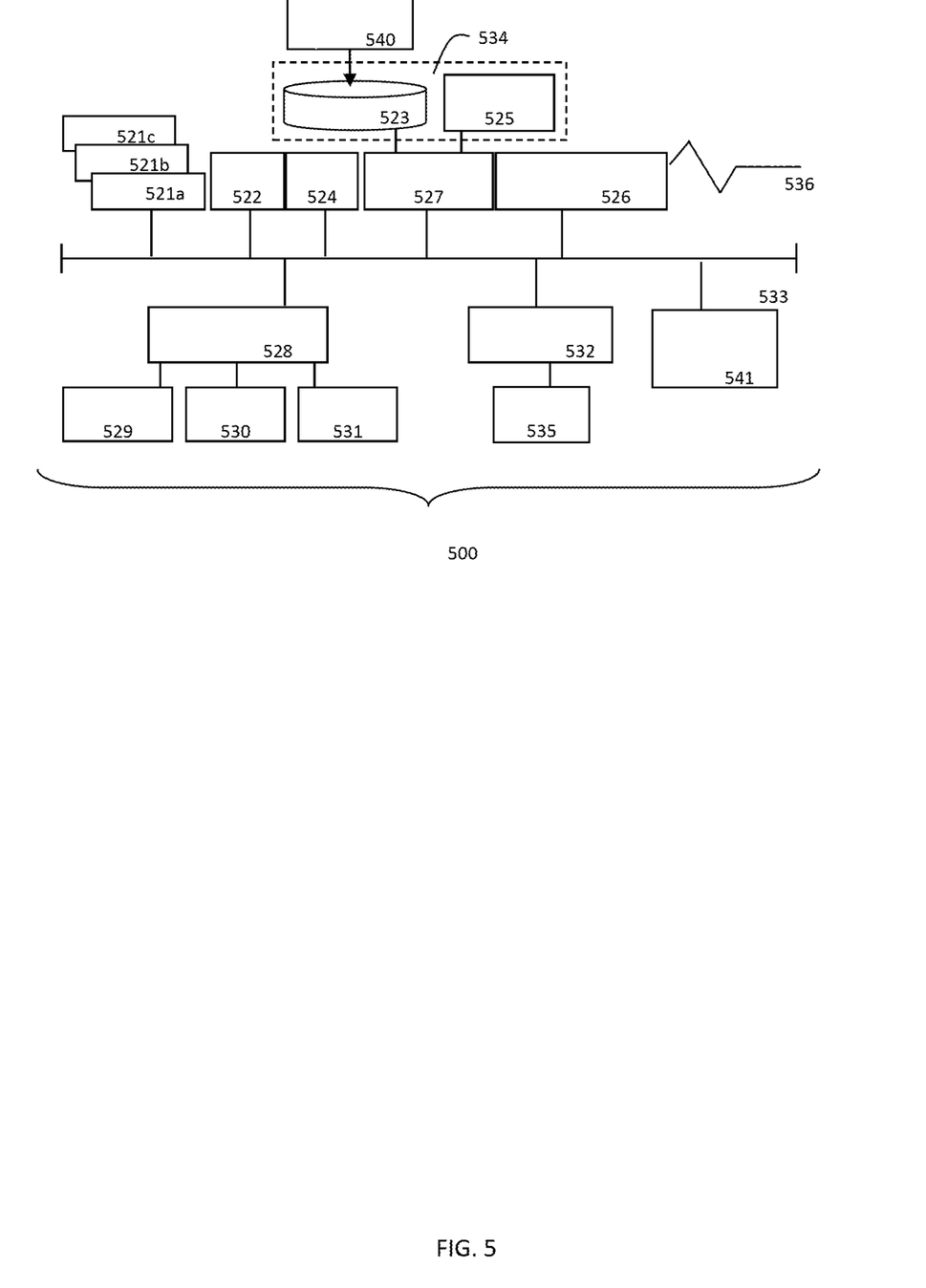
FIG. 5 is a block diagram of a computer system for use in implementing one or more embodiments of the present disclosure.

It is understood that the present disclosure is capable of being implemented in conjunction with any other type of computing environment now known or later developed. For example, FIG. 5 depicts a block diagram of a processing system 500 for implementing the techniques described herein. In examples, the processing system 500 has one or more central processing units (processors) 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of the processing system 500.

Further depicted are an input/output (I/O) adapter 527 and a network adapter 526 coupled to the system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to the system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to the system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. An input device 529 (e.g., a keyboard, a microphone, a touchscreen, etc.), an input pointer 530 (e.g., a mouse, trackpad, touchscreen, etc.), and/or a speaker 531 may be interconnected to system bus 533 via user interface adapter 528, which may include, for example, a Super I/O chip integrating multiple device adapters into a single integrated circuit. One or more of the cameras 120-123, 130-133 are also connected to the system bus 533.

In some aspects of the present disclosure, the processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, the processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in the processing system 500.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that, various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for personalization of adjustable features of a vehicle, the method comprising:
    capturing a two-dimensional image of a person with a camera;
    processing, by a processor, the two-dimensional image to detect key points of the person comprising extracting coordinates of the key points with a neural network and predict a pose of the person using a classifier;
    translating, by the processor, the positions of the key points from a two-dimensional coordinate system to a three-dimensional coordinate system, comprising converting two-dimensional coordinates to three dimensional coordinates using the positions of the two-dimensional key points, parameters of the camera, and constraints based upon the predicted pose;
    determining, by the processor, a baseline configuration of an adjustable feature of the vehicle based in part on measurements between the key points in the three-dimensional coordinate system; and
    causing, by the processor, an actuator to adjust the adjustable feature of the vehicle to conform to the baseline configuration.

2. The method of claim 1, wherein the adjustable feature of the vehicle is one of seat, a side mirror, or a rear-view mirror.

3. The method of claim 1, wherein the pose is one of standing, sitting, and walking.

4. The method of claim 1, wherein the measurements are based in part on the pose.

5. The method of claim 1 further comprising:
    associating the baseline configuration of the adjustable feature of the vehicle with an identity of the person; and
    storing the associated identity and baseline configuration in a remote database.

6. The method of claim 1 further comprising:
    recording a change in the adjustable feature of the vehicle from the baseline configuration by the person; and
    updating the baseline configuration in the database, based on the change to the adjustable feature of the vehicle exceeding a threshold amount.

7. A system for personalization of adjustable features of a vehicle, the system comprising:
    a camera for capturing a two-dimensional image of a person;
    a memory having computer readable instructions; and
    a processor for executing the computer readable instructions, the computer readable instructions controlling the one or more processors to perform operations comprising:
    processing, by the processor, the two-dimensional image to detect key points of the person comprising extracting coordinates of the key points with a neural network and predict a pose of the person using a classifier;
    translating, by the processor, the positions of the key points from a two-dimensional coordinate system to a three-dimensional coordinate system and measurements of distances between the key points, comprising converting two-dimensional coordinates to three dimensional coordinates using the positions of the two-dimensional key points, parameters of the camera, and constraints based upon the predicted pose;
    determining, by the processor, a baseline configuration of an adjustable feature of the vehicle based in part on measurements between the key points in the three-dimensional coordinate system; and
    causing, by the processor, an actuator to adjust the adjustable feature of the vehicle to conform to the baseline configuration.

8. The system of claim 7, wherein the adjustable feature of the vehicle is one of a seat, side view mirror, or a rear-view mirror.

9. The system of claim 7, wherein the pose is one of standing, sitting, and walking.

10. The system of claim 7, wherein the measurements are based in part on the pose.

11. The system of claim 7, the operations further comprise:
    associating the baseline configuration of the adjustable feature of the vehicle with an identity of the person; and
    storing the associated identity and baseline configuration in a remote database.

12. The system of claim 7, the operations further comprising:
    recording a change in the adjustable feature of the vehicle from the baseline configuration by the person; and
    updating the baseline configuration in the database, based change to the adjustable feature of the vehicle exceeding a threshold amount.

13. A computer program product comprising a computer readable storage medium having program instructions embodied therein, the program instructions executable by a processor to cause the processor to perform operations comprising:
    processing, by the processor, the two-dimensional image from a camera to detect key points of the person comprising extracting coordinates of the key points with a neural network and predict a pose of the person using a classifier;

translating, by the processor, the positions of the key points from a two-dimensional coordinate system to a three-dimensional coordinate system and measurements of distances between the key points, comprising converting two-dimensional coordinates to three dimensional coordinates using the positions of the two-dimensional key points, parameters of the camera, and constraints based upon the predicted pose;

determining, by the processor, a baseline configuration of an adjustable feature of the vehicle based in part on measurements between the key points in the three-dimensional coordinate system; and causing, by the processor, an actuator to adjust the adjustable feature of the vehicle to conform to the baseline configuration.

14. The computer program product of claim 13, wherein the adjustable feature of the vehicle is one of a seat, side view mirror, or a rear-view mirror.

15. The computer program product of claim 13, wherein the pose is at least one of standing, sitting, and walking.

16. The computer program product of claim 13, wherein the measurements are based in part on the pose.

17. The computer program product of claim 13, the operations further comprising:
   associating the baseline configuration of the adjustable feature of the vehicle with an identity of the person; and
   storing the associated identity and baseline configuration in a remote database.

18. The method of claim 1 wherein the parameters of the camera comprise a focal length, a principal point offset, a rotational matrix and a translational matrix.

19. The system of claim 7, wherein the parameters of the camera comprise a focal length, a principal point offset, a rotational matrix and a translational matrix.

20. The computer program product of claim 13, wherein the parameters of the camera comprise a focal length, a principal point offset, a rotational matrix and a translational matrix.

* * * * *